(12) United States Patent
Ehrlich

(10) Patent No.: US 6,824,341 B2
(45) Date of Patent: Nov. 30, 2004

(54) INTEGRATED ANCHORING SYSTEM AND COMPOSITE PLATE FOR A TRAILER SIDE WALL JOINT

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 10/192,913

(22) Filed: Jul. 10, 2002

(65) Prior Publication Data

US 2003/0080586 A1 May 1, 2003

Related U.S. Application Data

(60) Provisional application No. 60/304,432, filed on Jul. 10, 2001.

(51) Int. Cl.[7] .................................................. B60P 7/15
(52) U.S. Cl. ....................... 410/150; 410/115; 410/143; 410/144; 410/145; 296/181; 296/191
(58) Field of Search ................................. 410/115, 116, 410/143, 144, 145, 150; 296/181, 183, 191; 52/309.2, 584.1, 586.1

(56) References Cited

U.S. PATENT DOCUMENTS

| | | | |
|---|---|---|---|
| 4,230,432 A | 10/1980 | Howell | 410/102 |
| 4,509,888 A | 4/1985 | Sheek | 410/105 |
| 4,553,888 A | 11/1985 | Crissy et al. | 410/144 |
| 5,020,948 A * | 6/1991 | Ihara | 410/105 |
| 5,338,137 A | 8/1994 | Jensen | 410/146 |
| 5,509,714 A * | 4/1996 | Schmidt | |
| 5,700,118 A * | 12/1997 | Bennett et al. | 410/113 |
| 5,785,475 A * | 7/1998 | Winstel et al. | 410/146 |
| 5,807,047 A * | 9/1998 | Cox | 410/152 |
| 5,860,693 A | 1/1999 | Ehrlich | |
| 5,934,849 A * | 8/1999 | Haire | 410/113 |
| 5,941,667 A * | 8/1999 | Hardison | 410/146 |
| 5,979,876 A | 11/1999 | Cardona | |
| 5,992,117 A * | 11/1999 | Schmidt | |
| 6,074,143 A | 6/2000 | Langston et al. | 410/89 |
| 6,412,854 B2 * | 7/2002 | Ehrlich | |
| 6,626,622 B2 * | 9/2003 | Zubko | 410/113 |

OTHER PUBLICATIONS

A copy of Kaptive Beam System product brochure Copyright 1999, Kinedyne Corporation Bulletin KB0599 (four pages).
A copy of Material Handling Systems Ancra Interantional LLC fold–out product brochure titled "Introducing a Remarkable Way to Maximize Your Trailer's Capacity", Copyright 2000 Ancra International LLC.

* cited by examiner

*Primary Examiner*—Stephen Gordon
(74) *Attorney, Agent, or Firm*—Trexler, Bushnell, Giangiorgi, Blackstone & Marr, Ltd.

(57) ABSTRACT

The present invention provides a novel joint which includes an anchoring system between composite plate side walls of a trailer body. The anchoring system includes track members which are provided at multiple points on each side wall. Beams extend between the respective track members by attachments and are attached thereto. The beams can be moved up and down along the tracks and support cargo or a removable deck which supports the cargo. The track members can also be removed from the joints without dismantling the entire joint. Splicing members are attached at the joints on the outside of the trailer body.

44 Claims, 11 Drawing Sheets

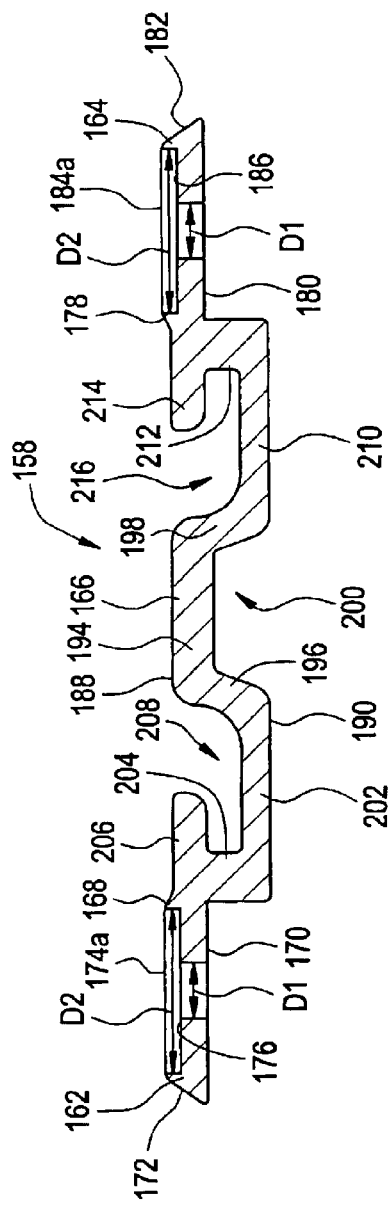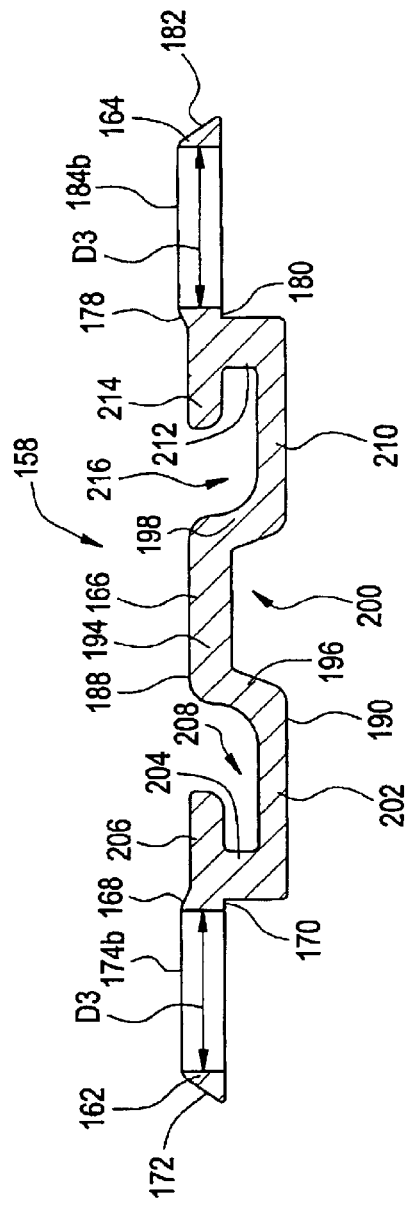

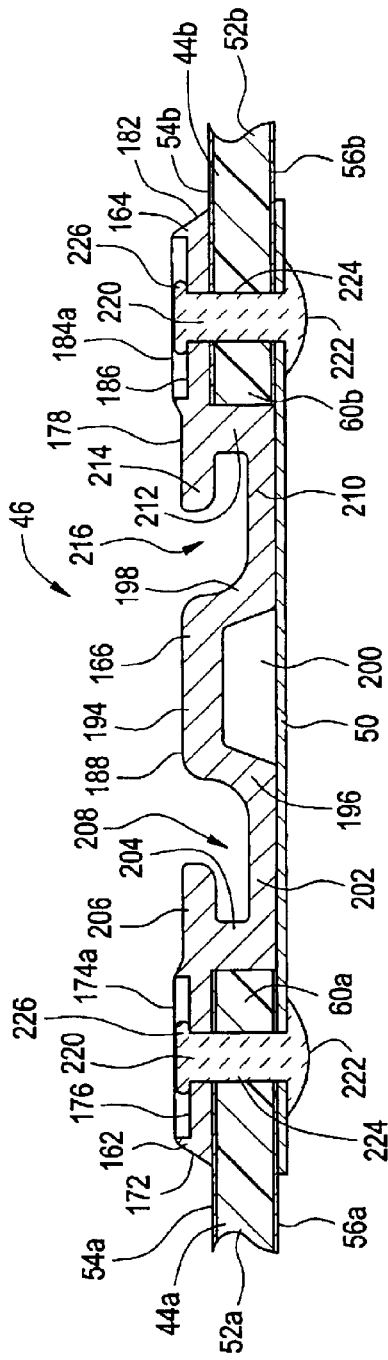
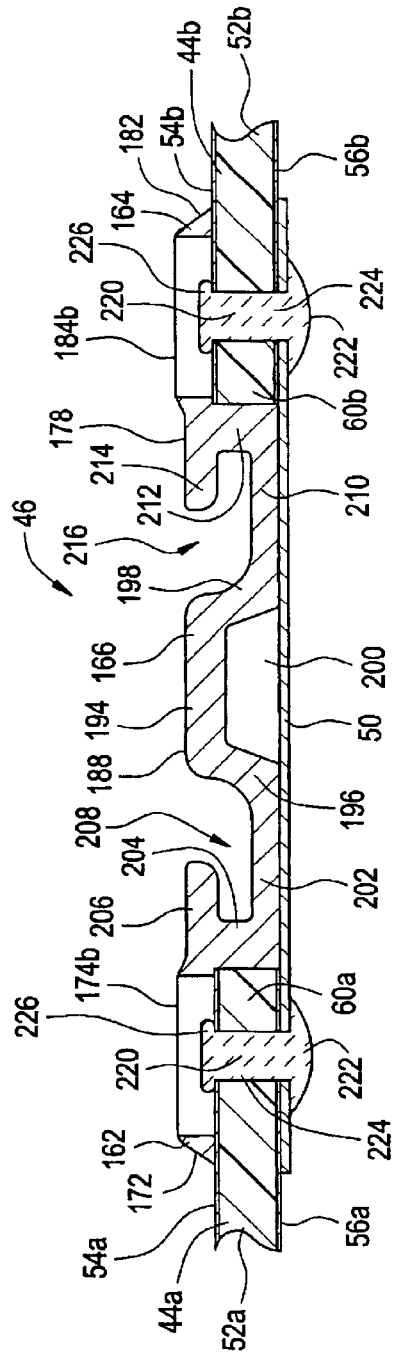

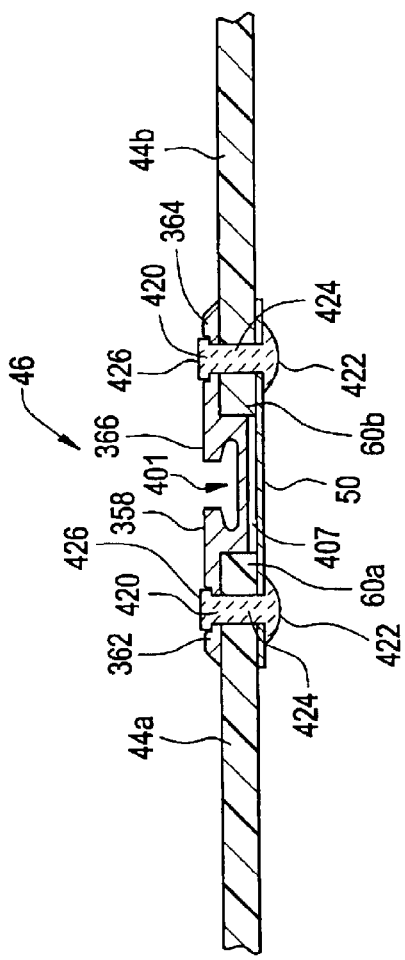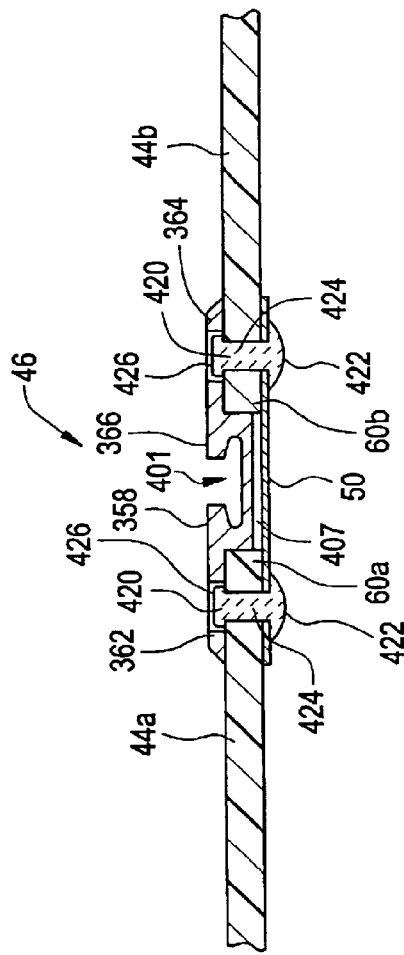

US 6,824,341 B2

INTEGRATED ANCHORING SYSTEM AND COMPOSITE PLATE FOR A TRAILER SIDE WALL JOINT

This application claims the domestic priority of U.S. Provisional Application Ser. No. 60/304,432, filed on Jul. 10, 2001, and entitled "Integrated Anchoring System and composite Plate for a Trailer Side Wall Joint".

BACKGROUND OF THE INVENTION

Many different kinds of anchoring systems exist for use in the interior of trailers for supporting cargo or a removable deck which supports cargo. Two such systems are provided by Kinedyne Corporation and Ancra International LLC.

Each of these anchoring systems have a number of elongated track members which generally run along the interior side walls of a trailer, from a position proximate to the roof of the trailer to a position proximate to a top of a scuff plate provided on the respective side wall proximate to the floor of the trailer. The track members are attached to the interior surface of the side walls and, thus, extend into the interior space of the trailer body. As a result, the track members can be easily damaged by forklifts or other means. In addition, because the track members extend into the interior space of the trailer body, the track members take up room within the trailer body, thus leaving less room for cargo to be stored within the trailer body.

Thus, there is a need for a track member of an anchoring system that will have a lower profile on the inside of the trailer body such as to help prevent the damage of the track member by forklifts or other means and to allow for more cargo to be stored within the trailer body. The present invention provides such an anchoring system.

OBJECTS AND SUMMARY OF THE INVENTION

A primary object of the invention is to provide a joint between composite plate side walls of a trailer body which includes an anchoring system.

Another object of the invention is to provide an anchoring system which will be caused less damage by forklifts or other means than prior art anchoring systems.

Another object of the invention is to provide a joint between composite plate side walls which includes an anchoring system where the composite plates reinforce a track member of the anchoring system such that the track member cannot spread even if it is hit with a forklift.

Yet another object of the invention is to provide a joint between composite plate side walls which includes an anchoring system where the anchoring system is not a structural post of the joint as the composite plates provide the structural strength for the side walls.

A further object of the invention is to provide a joint which includes an anchoring system that can be removed from between composite plate side walls without requiring the entire side wall to be dismantled.

Still another object of the invention is to provide an anchoring system that is formed of roll formed 14 gauge steel, as opposed to extruded aluminum, as the roll formed 14 gauge steel allows for better manufacturing.

The present invention provides a novel joint between composite plate side walls of a trailer body which includes an anchoring system. The anchoring system includes track members which are provided at multiple points on each side wall between the composite plates. Beams extend between the respective track members by attachments and are attached thereto. The beams can be moved up and down along the tracks and support cargo or a removable deck which supports the cargo. The track members can be removed from the side walls without dismantling the entire joint. Splicing members, which also form part of the joint, are attached to the side walls on the outside of the trailer body.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 5 is a cross-sectional view of the track member shown in FIG. 4 along line 5—5;

FIG. 5A is a cross-sectional view of the track member shown in FIG. 4 along line 5A—5A;

FIG. 6 is a first cross-sectional view of the joint including the track member shown in FIG. 5;

FIG. 6A is a second cross-sectional view of the joint including the track member shown in FIG. 5A;

FIG. 11 is a first cross-sectional view of the joint including the track member shown in FIG. 10;

FIG. 11A is a second cross-sectional view of the joint including the track member shown in FIG. 10A;

DETAILED DESCRIPTION OF THE PREFERRED EMBODIMENT

Figure 1:
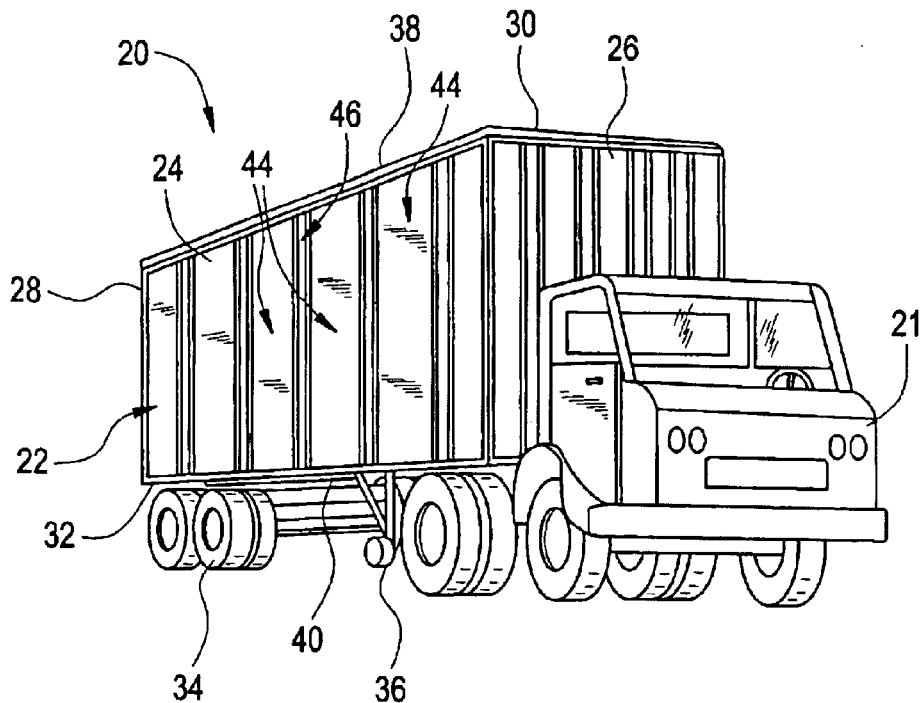
FIG. 1 is a perspective view of a trailer and a tractor.
Figure 3:
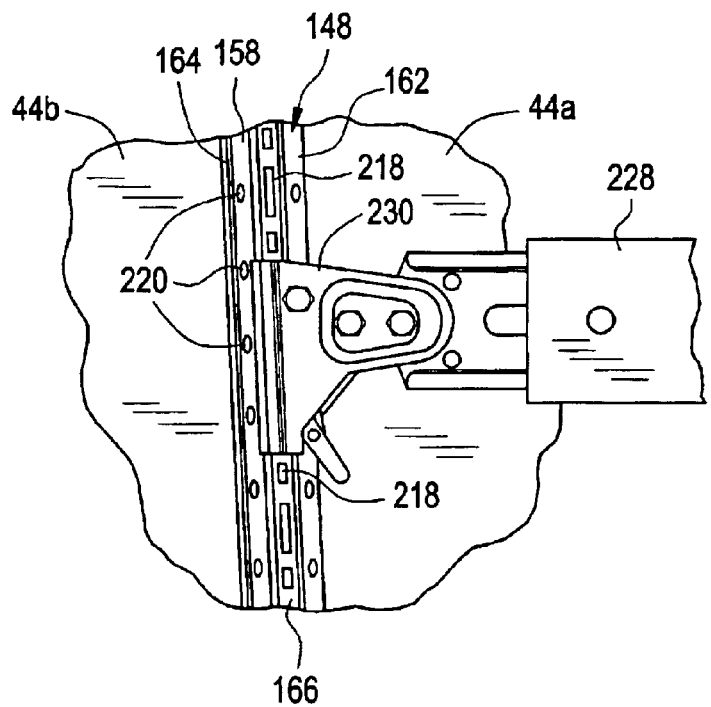
FIG. 3 is a partial perspective view of the joint shown in FIG. 2.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel a joint 46 between side plates 44 of the side walls 24 of a trailer 20 which includes an anchoring system 148, 348. The anchoring system 148, 348 is used to support cargo 236, 436 or to support a deck 238, 438 which supports the cargo 236, 436. A first embodiment of the joint 46 shown in FIGS. 2–7 and a second embodiment of the joint 46 is shown in FIGS. 8–13. Like elements are denoted with like reference numerals with the first embodiment being in the one and two hundreds, and the second embodiment being in the three and four hundreds.

The trailer 20, which is shown in FIG. 1 connected to a tractor 21, includes a body 22 formed from a pair of rectangular side walls 24 a front wall 26, rear doors 28, a top panel or roof 30 and a floor 32. The floor 32 is supported by a conventional rear undercarriage assembly 34 and has a landing gear 36 secured thereunder. The roof 30 and an upper portion of the side walls 24 are secured to a top rail 38 while the floor 32 and a lower portion of the side walls 24 are secured to a bottom rail 40. The interior of the trailer 20 has scuff plates 42 which generally extend along the entire length of the side walls 24 and from the floor 32 to a position below the roof 30.

Each side wall 24 includes a plurality of vertical upstanding composite side plates 44 joined together by the joints 46. Each joint 46 includes the anchoring system 148, 348 and a splicing plate 50. The anchoring system 148, 348 is attached to the inner surface of the side plates 44 and between the side plates 44. The splicing plate 50 is attached to the exterior of the side plates 44. At least two plates 44a, 44b are joined together by the joints 46 to form the side wall 24 of the trailer body 22. While only a portion of two joined plates 44a, 44b are shown in some of the drawings, it is to be understood that a plurality of plates may be used to form each side wall 24. In addition, the anchoring system 148, 348 is only shown between one end of the two plates 44a, 44b. It is to be understood that a like anchoring system 148, 348 is provided between each adjacent end of each plate 44 used to form the trailer side walls 24.

Each composite side plate 44 includes a plastic core member 52 sandwiched between an inner thin metal skin 54 and an outer thin metal skin 56 and bonded thereto by a suitable known adhesive or other like means. The inner skin 54 and the outer skin 56 are preferably approximately 0.026 inches thick. The skins 54, 56 are preferably made of aluminum; galvanized, full hardened steel, such as AISI Grade E full hard steel because of its cost effectiveness, or the like. Preferably, the outer skin 56 is made of ASTM G90 galvanized steel and the inner skin 54 is made of ASTM G60 galvanized steel. Aluminum may be used, but it may be too soft for some purposes and strength and punch resistance are sacrificed, however, aluminum is lightweight. Typically, each plate 44 is four feet in width, but can be longer or shorter depending on the application. Each core member 52 is made of some type of compressible non-metal material, preferably thermoplastic, such as polypropylene or high density polyethylene. These materials are relatively inexpensive as compared to aluminum found in prior trailer wall constructions. In addition, because a composite plate 44 is used, the weight of the trailer construction is reduced over trailers having aluminum side walls.

Figure 2:
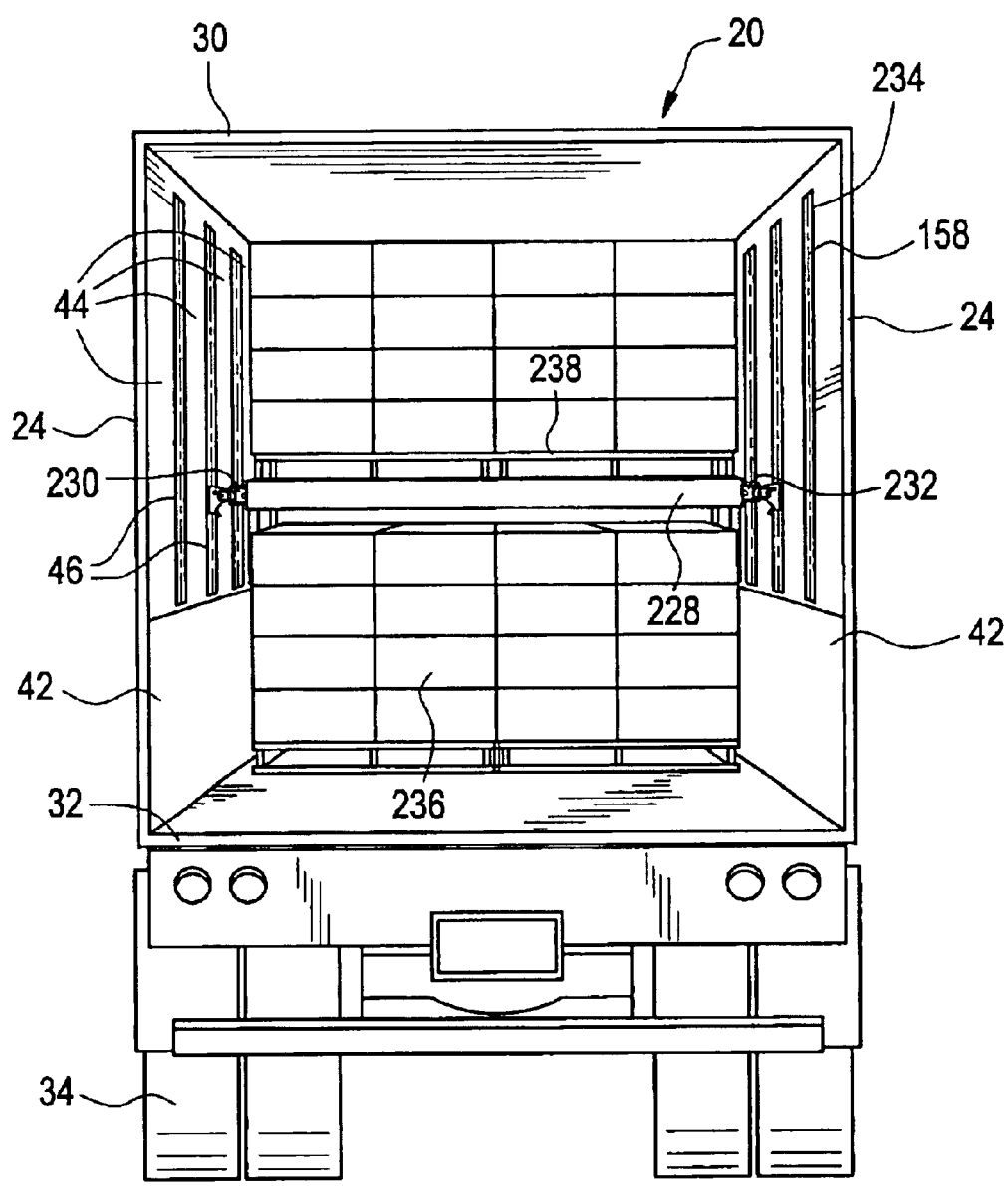
FIG. 2 is a perspective view of the interior of the trailer of FIG. 1 having joints which include an anchoring system which incorporates the features of a first embodiment of the invention.

Attention is now invited to the first embodiment of the novel joint 46 which includes the anchoring system 148 shown in FIGS. 2–7. First and second composite plates 44a, 44b are shown and are joined together by a track member 158 on the inside of the trailer 20 which extends from a point above the scuff plate 42 to a point proximate to, but spaced from, the roof 30 of the trailer 20, as shown in FIG. 2, and by the splicing plate 50 on the outside of the trailer 20 which extends along the entire height of the plates 44a, 44b. The ends 60a, 60b of the plates 44a, 44b are spaced apart from each other when joined by the track member 158 and the splicing plate 50 such that a portion of the track member 158 is positioned between the ends 60a, 60b of the plates 44a, 44b, as will be discussed in more detail herein.

The track member 158 is an elongated member having a first end portion 162, a second end portion 164 and a middle portion 166 therebetween that is integral with the first end portion 162 and the second end portion 164. The track member 158 is preferably formed from either extruded aluminum or roll formed 14 gauge steel, see FIG. 7, which allows for better manufacturing than extruded aluminum.

The first end portion 162 has an inner surface 168, an outer surface 170, and an end 172. The end 172 is angled outwardly from the inner surface 168 to the outer surface 170. The outer surface 170 of the first end portion 162 is generally flat and lays against the inner skin 54a of the plate 44a. The inner surface 168 of the first end portion 162 is also generally flat.

Figure 4:
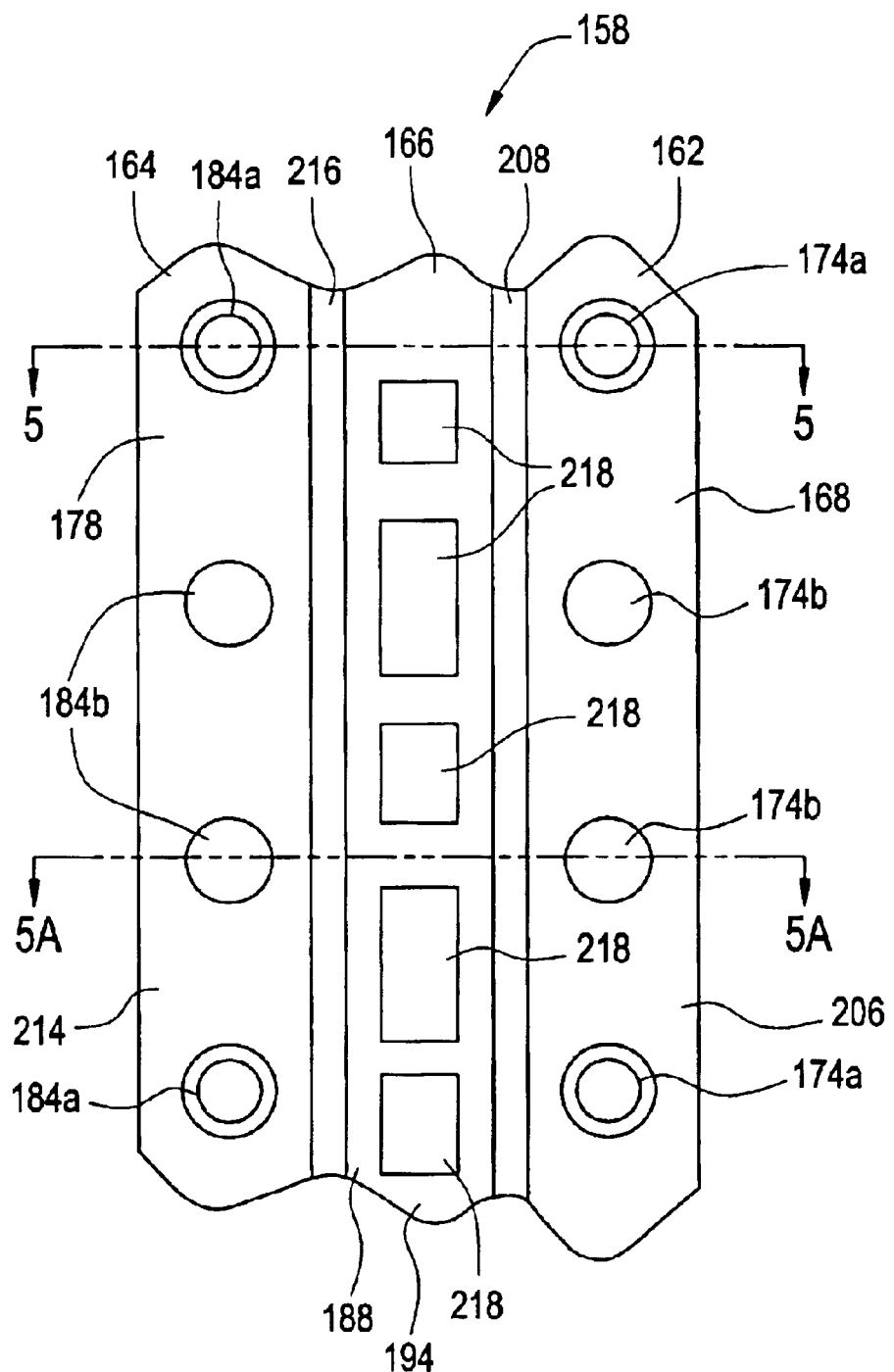
FIG. 4 is a partial front elevational view of a track member which forms a portion of the anchoring system according to the first embodiment of the invention.
Figure 7:
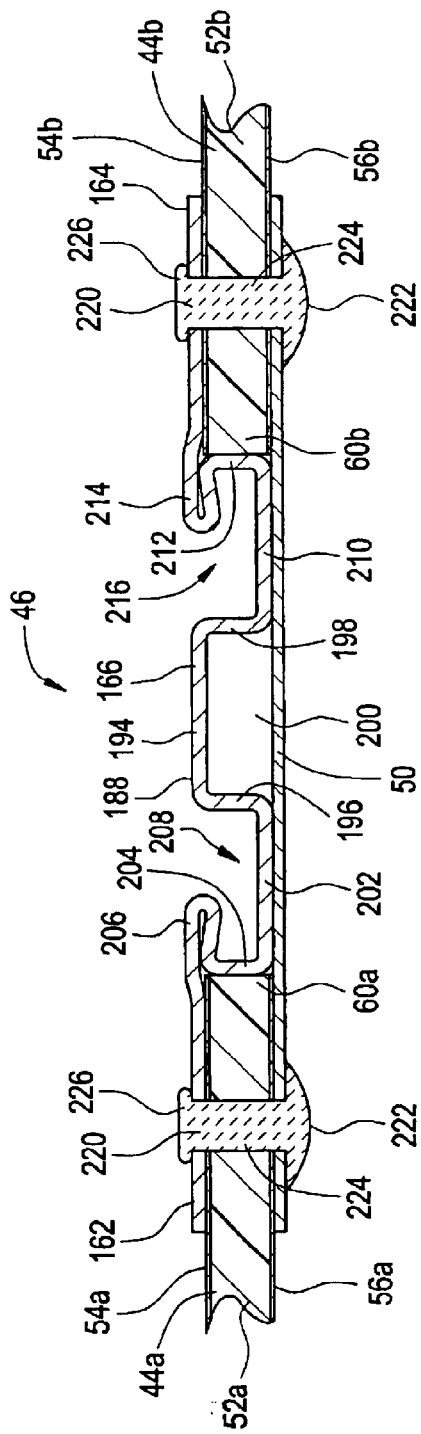
FIG. 7 is a cross-sectional view of the joint having a track member formed from rolled steel.

As best shown in FIGS. 4, 5 and 5A, the first end portion 162 has a plurality of apertures 174 therethrough. The apertures 174 are preferably provided at a distance of 1.5 inches apart from one another from their centers along the entire length of the track member 158. Two different sizes of apertures 174a, 174b are provided through the first end portion 162.

Aperture 174a has a first diameter D1 and a second diameter D2 which are separated by a shoulder 176. The first diameter D1 is proximate to the inner skin 54a of the plate 44a and the second diameter D2 is distal from the inner skin 54a of the plate 44a. The second diameter D2 is larger than the first diameter D1 for reasons which will become apparent hereinafter.

Aperture 174b has a third diameter D3. The third diameter D3 is preferably the same size as the second diameter D2, but the third diameter D3 can be either larger or smaller than the second diameter D2.

Along the length of the track member 158, it is preferable that the pattern of the apertures 174a, 174b be such that every third aperture 174 be an aperture 174a, having both the first diameter D1 and the second diameter D2, with the two other apertures 174 being apertures 174b, having the third diameter D3, for reasons which will be discussed herein. It should be noted, though, that any pattern of the apertures 174a, 174b can be used along the length of the track member 158.

The second end portion 164 is preferably a mirror image of the first end portion 162. The second end portion 164 has an inner surface 178, an outer surface 180, and an end 182 that is angled outwardly from the inner surface 178 to the outer surface 180. The outer surface 180 of the second end portion 164 is generally flat and lays against the inner skin 54b of plate 44b. The inner surface 178 of the second end portion 164 is also generally flat.

As best shown in FIGS. 4, 5 and 5A, the second end portion 164 has a plurality of apertures 184 therethrough. The apertures 184 are preferably provided at a distance of 1.5 inches apart from one another from their centers along the entire length of the track member 158. Two different sizes of apertures 184a, 184b are provided through the second end portion 164.

Aperture 184a has a first diameter D1, which is equivalent to the first diameter D1 of aperture 174a, and a second diameter D2, which is equivalent to the second diameter D2 of aperture 174a, which are separated by a shoulder 186. The first diameter D1 is proximate to the inner skin 54b of the plate 44b and the second diameter D2 is distal from the inner skin 54b of the plate 44b. The second diameter D2 is larger than the first diameter D1 for reasons which will become apparent hereinafter.

Aperture 184b has a third diameter D3, which is equivalent to the third diameter D3 of aperture 174b. The third diameter D3 is preferably the same size as the second diameter D2, but the third diameter D3 can be either larger or smaller than the second diameter D2.

Along the length of the track member 158, it is preferable that the pattern of the apertures 184a, 184b be that every third aperture 184 be an aperture 184a having both the first diameter D1 and the second diameter D2, with the two other apertures 184 being apertures 184b having the third diameter D3, as shown in FIG. 4, for reasons which will be discussed herein. It should be noted, though, that any pattern of the apertures 184a, 184b can be used along the length of the track member 158. In any event, the apertures 174a, 174b of the first end portion 162 and the aperture 184a, 184b of the second end portion 164 should be in alignment with one another, i.e., aperture 174a is directly opposite aperture 184a while aperture 174b is directly opposite aperture 184b.

The middle portion 166 of the track member 158 also has an inner surface 188 and an outer surface 190. The inner surface 188 of the middle portion 166 extends from the inner surface 168 of the first end portion 162 to the inner surface 178 of the second end portion 164. Likewise, the outer surface 190 of the middle portion 166 extends from the outer surface 170 of the first portion 162 to the outer surface 180 of the second portion 164.

The middle portion 166 is generally U-shaped and has a flat base 194 and two legs 196, 198 extending outwardly at an angle from opposite ends of the base 194, such that a recess 200 is formed between the base 194 and the legs 196, 198.

A first portion 202 extends from an end of the leg 196 in a direction generally perpendicular to the leg 196 and parallel to the base 194. A second portion 204 extends perpendicularly from an end of the first portion 202, that is opposite of an end in which the first portion 202 extends from the leg 196. A third portion 206 extends perpendicularly from an end of the second portion 204, that is opposite of an end in which the second portion 204 extends from the first portion 202. The third portion 206 is parallel to the base 194 and to the first portion 202 and extends back toward the base 194 such that an L-shaped slot 208 is formed between the leg 196, the first portion 202, the second portion 204, and the third portion 206, with the slot 208 having its opening between the third portion 206 and the base 194.

Similarly, a fourth portion 210 extends from an end of the leg 198 in a direction generally perpendicular to the leg 198 and parallel to the base 194. A fifth portion 212 extends perpendicularly from an end of the fourth portion 210, that is opposite of an end in which the fourth portion 210 extends from the leg 198. A sixth portion 214 extends perpendicularly from an end of the fifth portion 212, that is opposite of an end in which the fifth portion 212 extends from the fourth portion 210. The sixth portion 214 is parallel to the base 194 and to the fourth portion 210 and extends back toward the base 194 such that an L-shaped slot 216 is formed between the leg 198, the fourth portion 210, the fifth portion 212, and the sixth portion 214, with the slot 216 having its opening between the sixth portion 214 and the base 194.

The first end portion 162, the second end portion 164, the base 192, and the third and sixth portions 206, 214 of the middle portion 166 are co-planar with one another.

The base 194 of the middle portion 166 has a plurality of apertures 218 therethrough. The apertures 218 are spaced apart a suitable distance from one another and can be in different shapes and sizes, but are preferably in the shape of squares and rectangles.

To form the joint 46, the track member 158 is assembled with the composite plates 44a, 44b such that the middle portion 166 is positioned between the plates 44a, 44b. The outer surface 190 of the second portion 204 of the middle portion 166 is flush with the end 60a of the composite plate 44a while the outer surface 190 of the fifth portion 212 of the middle portion 166 is flush with the end 60b of the composite plate 44b. The outer surface 170 of the first end portion 162 sits against the inner skin 54a of the composite plate 44a and the outer surface 180 of the second end portion 164 sits against the inner skin 54b of the composite plate 44b.

The splicing plate 50 is placed against the outer surface of the outer skins 56a, 56b and extends from the bottom rail 38 to the top rail 40. The splicing plate 50 is flat and lies against the outer surfaces of the outer skins 56a, 56b and against the outer surface 190 of the middle portion 166 of the track member 158 along the first and fourth portions 202, 210 of the middle portion 166. A space is formed between the splicing plate 50, the base 192 and the legs 194, 196. The splicing plate 50 seals the junction between the plates 44a, 44b on the exterior of the trailer 20 so as to seal the interior from moisture. The splicing plate 50 can also be formed with an outward bulge to increase the space formed between the splicing plate 50 and the track 158.

The track member 158 and the splicing plate 50 are attached to the first and second plates 44a, 44b by suitable means, such as rivets 220, as shown in FIGS. 6 and 6A. The rivets 220 have a head 222 and a shank 224 extending therefrom. The shanks 224 of the rivets 220 have a diameter that is commensurate with the first diameter D1 of the apertures 174a, 184a. As the attachment of the rivets 220 to the track member 158, the splicing plate 50, and the first plate 44a is identical to the attachment of the rivets 220 to the track member 158, the splicing plate 50, and the second plate 44b, the discussion relating to the attachment of the rivets 220 will be focused on only the attachment of the track member 158, the splicing plate 50, and the first plate 44a, with the understanding that the same would be done for the attachment of the track member 158, the splicing plate 50, and the second plate 44b.

To assemble the rivets 220 with the track member 158, the splicing plate 50 and the first plate 44a, at each aperture 174a, the shank 224 of a rivet 220 is passed through the splicing plate 50, through the plate 44a, and through the first and second diameters D1, D2 of the aperture 174a of the first end portion 162 of the track member 158. A bloom 226 is formed by conventional means at the end of the rivet 220 opposite the head 222. The bloom 226 has a diameter that is smaller than the second diameter D2 of the aperture 174a but that is larger than the first diameter D1 of the aperture 174a. Thus, the bloom 226 lays along the shoulder 176 of the first end portion 162 of the track member 158 within the second diameter D2 of the aperture 174a, and the rivet 220 attaches the track member 158, the plate 44a and the splicing plate 50 together.

Similarly, to assemble the rivets 220 with the track member 158, the splicing plate 50 and the first plate 44a, at each aperture 174b, the shank 224 of a rivet 220 is passed through the splicing plate 50, through the plate 44a, and through the aperture 174b of the first end portion 162 of the track member 158. A bloom 226 is formed by conventional means at the end of the rivet 220 opposite the head 222. The bloom 226 has a diameter that is smaller than the third diameter D3 of the aperture 174b. Thus, unlike the bloom 226 within the aperture 174a, the bloom 226 within the aperture 174b lays along the inner skin 54a of the plate 44a and within the third diameter D3 of the aperture 174b, and attaches the plate 44a and the splicing plate 50 together. The rivets 220 within the apertures 174b do not attach the track member 158 to the plate 44a and to the splicing plate 50.

The rivets 220 within the apertures 174b do not attach the track member 158 to the plate 44a and to the splicing plate 50 in order to prevent the total disassembly of the side wall 24 should the track member 158 become damaged. If the track member 158 becomes damaged, it can be easily removed by removing only the rivets 220 attaching the track member 158, the plate 44a and the splicing plate 50 together. When these rivets 220 are removed, the rivets 220 that attach the plate 44a to the splicing plate 50, and which are within the apertures 174b of the track member 158, will hold the side wall 24 in place until a new track member 158 is attached into place. This is because the track member 158 is not a structural post as the plates 44a, 44b provide the structural strength. A benefit of this construction is that because the plates 44a, 44b reinforce the track member 158, the track member 158 does not spread even if it is hit with a forklift.

As the blooms 226 are either positioned within the second diameter D2 of the apertures 174a or within the third diameter D3 of the apertures 174b, the blooms 226 are protected, as they are recessed within the apertures 174a, 174b, such that they will not be sheared off, by, for example, a forklift.

The anchoring system 148 thus has a generally low profile within the interior of the trailer 20 which will help prevent the damage of the track member 158 by forklifts or other means and will allow for more cargo to be stored within the body 22 of the trailer 20.

The track members 158 support a plurality of elongated beams 228. An example of a beam 228 of this type is the "KINEDYNE KAPTIVE BEAM™" which is manufactured and sold by Kinedyne Corporation. Each beam 228 has opposite ends 230, 232 at which the beam 228 has both sliding means (not shown), for sliding within the slots 208, 216 of the track member 158, and locking means (not shown), for locking the sliding means of the beam 228 into a desired position within the slots 208, 216. The sliding means is preferably a pair of L-shaped protrusions extending from the ends 230, 232 of the beam 228 that are formed to slide within the slots 208, 216. The locking means is preferably a device that can easily lock or unlock into the apertures 218 through the base 194 of the middle portion 166 of the track member 158.

In operation, the sliding means at one end 230 of the beams 228 is inserted into the slots 208, 216 at a top 234 of one of the track members 158 along one of the side walls 24. The sliding means at the opposite end 232 of the beam 228 is then inserted into the slots 208, 216 at the top 234 of another one of the track members 158 along the opposite side wall 24. The beam 228 telescopes to allow for insertion and connection of beam 228 to the track members 158 and movement of the beam 228 relative to the side wall 24.

The ends 230, 232 of the beam 228 are then lowered to a desired position and locked into place by the locking means. One end can be lowered and then the other end can be lowered, with the telescoping capability of the beam 228 allowing for this movement. When a number of beams 228 are positioned into place along the side walls 24, the beams 228 are capable of supporting cargo 236 or a removable deck 238. Should the cargo 236 within the trailer body 22 not need to be supported by the beams 228, the beams 228 can be slid within the slots 208, 216 toward the roof 30 of the trailer body 22 and locked into position by the locking means at the top 234 of the track member 158.

Attention is now invited to the second embodiment of the novel joint 46 which includes the anchoring system 348 shown in FIGS. 8–13. First and second composite plates 44a, 44b are shown and are joined together by a track member 358 on the inside of the trailer 20 which extends from a point above the scuff plate 42 to a point proximate to, but spaced from, the roof 30 of the trailer 20 and by a splicing plate 50 on the outside of the trailer 20 which extends along the entire height of the plates 44a, 44b. The ends 60a, 60b of the plates 44a, 44b are spaced apart from each other when joined by the track member 358 and the splicing plate 50 such that a portion of the track member 358 is positioned between the ends 60a, 60b of the plates 44a, 44b, as will be discussed in more detail herein.

The track member 358 is an elongated member having a first end portion 362, a second end portion 364 and a middle portion 366 therebetween that is integral with both the first end portion 362 and the second end portion 364. The track member 358 is preferably formed from aluminum. The middle portion 366 has a thickness that is thinner than a thickness of the first and second end portions 362, 364. The first end portion 362 and the second end portion 364 preferably have a thickness of 0.142 inches while the middle portion 366 preferably has a thickness of 0.09375 inches, thus creating a track member 358 that has a low profile at its center. The track member 358 can have a low profile at its center because the plates 44a, 44b reinforce the track member 358 so that the track member 358 cannot spread even if it is hit with a forklift as discussed further herein.

The first end portion 362 has an inner surface 368, an outer surface 370, and an end 372. The end 372 is angled outwardly from the inner surface 368 to the outer surface 370. The outer surface 370 of the first end portion 362 is generally flat and lays against the inner skin 54a of plate 44a. The inner surface 368 of the first end portion 362 is also generally flat.

Figure 9:
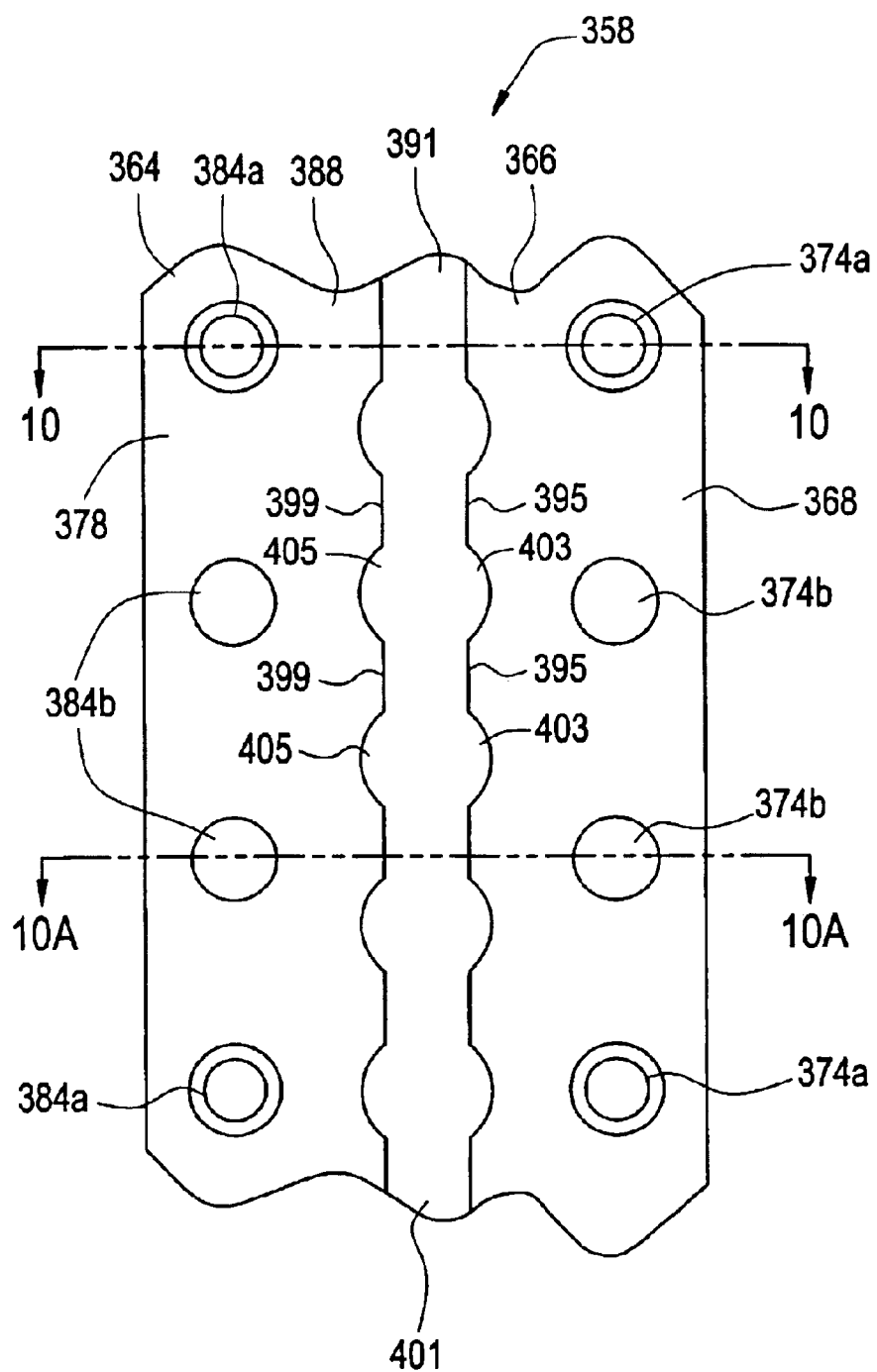
FIG. 9 is a partial front elevational view of a track member which forms a portion of the anchoring system according to the second embodiment of the invention.
Figure 10:
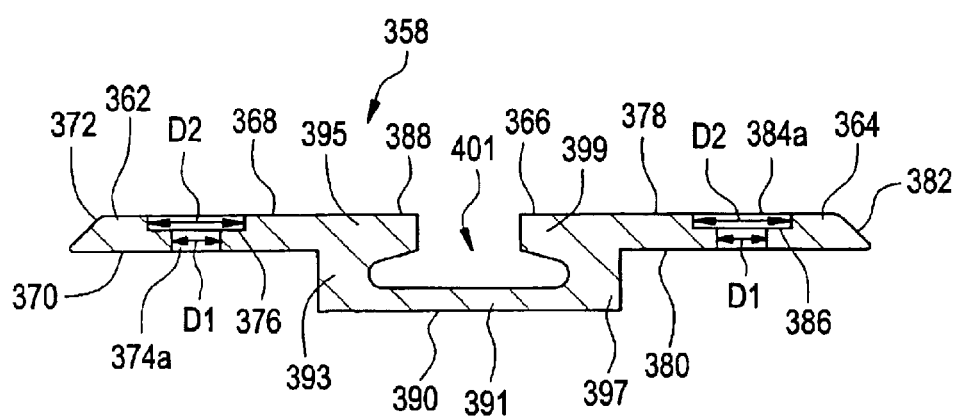
FIG. 10 is a cross-sectional view of the track member shown in FIG. 9 along line 10—10.
Figure 10A:
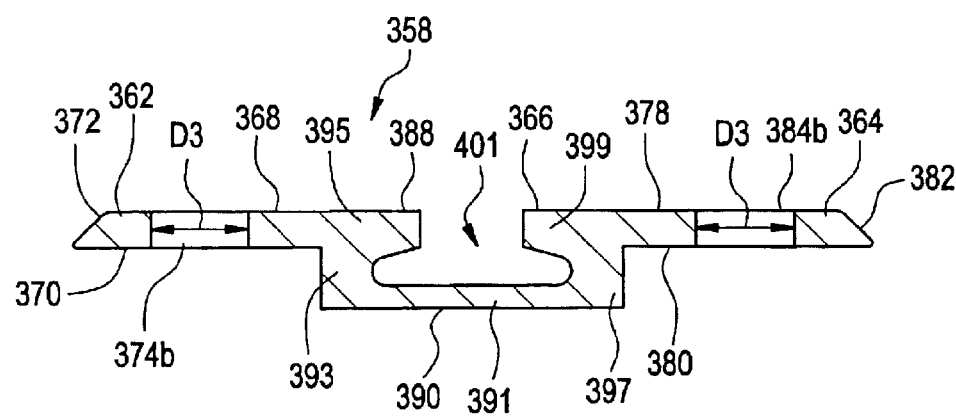
FIG. 10A is a cross-sectional view of the track member shown in FIG. 9 along line 10A—10A.
Figure 13:
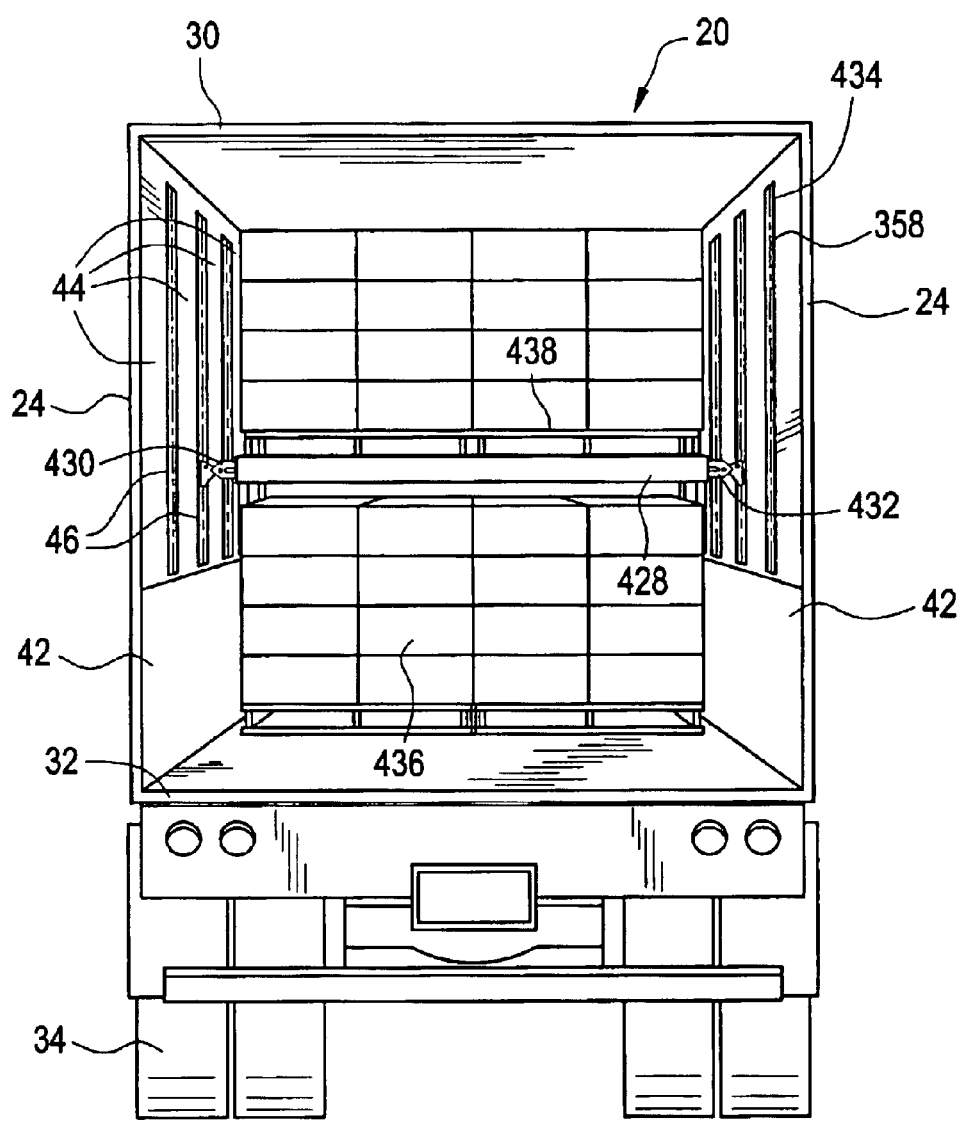
FIG. 13 is a perspective view of the interior of the trailer of FIG. 1 having joints which include an anchoring system which incorporates the features of a second embodiment of the invention.

As best shown in FIGS. 9, 10 and 10A, the first end portion 362 also has a plurality of apertures 374 therethrough. The apertures 374 are preferably provided at a distance of 1.5 inches apart from one another from their centers along the entire length of the track member 358. Two different sizes of apertures 374a, 374b are provided through the first end portion 362.

Aperture 374a has a first diameter D1 and a second diameter D2 which are separated by a shoulder 376. The first diameter D1 is proximate to the inner skin 54a of the plate 44a and the second diameter D2 is distal from the inner skin 54a of the plate 44a. The second diameter D2 is larger than the first diameter D1 for reasons which will become apparent hereinafter.

Aperture 374b has a third diameter D3. The third diameter D3 is preferably the same size as the second diameter D2, but the third diameter D3 can be either larger or smaller than the second diameter D2.

Along the length of the track member 358, it is preferable that the pattern of the apertures 374a, 374b be such that every third aperture 374 be an aperture 374a, having both the first diameter D1 and the second diameter D2, with the two other apertures 374 being apertures 374b, having the third diameter D3, as shown in FIG. 9, for reasons which will be discussed herein. It should be noted, though, that any pattern of the apertures 374a, 374b can be used along the length of the track member 358.

The second end portion 364 is preferably a mirror image of the first end portion 362. The second end portion 364 has an inner surface 378, an outer surface 380, and an end 382 that is angled outwardly from the inner surface 378 to the outer surface 380. The outer surface 380 of the second end portion 364 is generally flat and lays against the inner skin 54b of plate 44b. The inner surface 378 of the second end portion 364 is also generally flat.

As best shown in FIGS. 9, 10 and 10A, the second end portion 364 also has a plurality of apertures 384 therethrough. The apertures 384 are preferably provided at a distance of 1.5 inches apart from one another from their centers along the entire length of the track member 358. Two different types of apertures 384a, 384b are provided through the second end portion 364.

Aperture 384a has both a first diameter D1, which is equivalent to the first diameter D1 of aperture 374a, and a second diameter D2, which is equivalent to the second diameter D2 of aperture 374a, which are separated by a shoulder 386. The first diameter D1 is proximate to the inner skin 54b of the plate 44b while the second diameter D2 is distal from the inner skin 54b of the plate 44b. The second diameter D2 is larger than the first diameter D1 for reasons which will become apparent hereinafter.

Aperture 384b has a third diameter D3, which is equivalent to the third diameter D3 of aperture 374b. The third diameter D3 is preferably the same size as the second diameter D2, but the third diameter D3 can be either larger or smaller than the second diameter D2.

Along the length of the track member 358, it is preferable that the pattern of the apertures 384a, 384b be that every third aperture 384 be an aperture 384a having both the first diameter D1 and the second diameter D2, with the two other apertures 384 being apertures 384b having the third diameter D3, as shown in FIG. 9, for reasons which will be discussed herein. It should be noted, though, that any pattern of the apertures 384a, 384b can be used along the length of the track member 358. In any event, the apertures 374a, 374b of the first end portion 362 and the aperture 384a, 384b of the second end portion 364 should be in alignment with one another, i.e., aperture 374a is directly opposite aperture 384a while aperture 374b is directly opposite aperture 384b.

The middle portion 366 of the track member 358 also has an inner surface 388 and an outer surface 390. The inner surface 388 of the middle portion 366 extends from the inner surface 368 of the first end portion 362 to the inner surface 378 of the second end portion 364. Likewise, the outer surface 390 of the middle portion 366 extends from the outer surface 370 of the first portion 362 to the outer surface 380 of the second portion 364.

The middle portion 366 has a first portion 391 having opposite ends and which is parallel to the first end portion 362 and the second end portion 364. A second portion 393 extends perpendicularly from one end of the first portion 391. A third portion 395 extends perpendicularly from the opposite end of the second portion. The third portion 395 is parallel to the first portion 391 and extends away from the first end portion 362 toward the second end portion 364.

A fourth portion 397 extends perpendicularly from the opposite end of the first portion 391. A fifth portion 399 extends perpendicularly from the opposite end of the fourth portion 397. The fifth portion 399 is parallel to the first portion 391 and extends away from the second end portion 364 toward the first end portion 362 and the third portion 395.

The first end portion 362, the second end portion 364, and the third and fifth portions 395, 399 of the middle portion 366 are co-planar with one another.

A generally T-shaped slot 401 is formed between the first, second, third, fourth, and fifth portions 391, 393, 395, 397, 399 with the base of the generally T-shaped slot 401 being between the second portion 393 and the fourth portion 397, and the opening of the generally T-shaped slot 401 being between the third portion 395 and the fifth portion 399. The third and fifth portions 395 and 399 also have arc-shaped recesses 403, 405 cut out of them such that the slot 401 has a larger opening on the inside of the trailer body 20 where the arc-shaped recesses 403, 405 are located as opposed to where the arc-shaped recesses 403, 405 are not located. The recesses 403, 405 are spaced apart a suitable distance from one another and can be in different shapes and sizes, but are preferably in the shape of arcs.

To form the joint 46, the track member 358 is assembled with the composite plates 44a, 44b such that the middle portion 366 is positioned between the plates 44a, 44b. The outer surface 390 of the second portion 393 of the middle portion 366 is flush with the end 60a of the composite plate 44a while the outer surface 390 of the fourth portion 397 of the middle portion 366 is flush with the end 60b of the composite plate 44b. The outer surface 370 of the first end portion 362 sits against the inner skin 54a of the composite plate 44a and the outer surface 380 of the second end portion 364 sits against the inner skin 54b of the composite plate 44b.

The splicing plate 50 is placed against the outer surface of the outer skins 56a, 56b and extends from the bottom rail 38 to the top rail 40 of the trailer 20. The splicing plate 50 is flat and lies against the outer surfaces of the outer skins 56a, 56b. A gap 407 is formed between the splicing plate 50 and the first portion 391 of the middle portion 366 of the track member 358. The splicing plate 50 seals the junction between the plates 44a, 44b on the exterior of the trailer 20 so as to seal the interior from moisture.

The track member 358 and the splicing plate 50 are attached to the first and second plates 44a, 44b by suitable means, such as rivets 420, as shown in FIGS. 11 and 11A. The rivets 420 have a head 422 and a shank 424 extending therefrom. The shanks 424 of the rivets 420 have a diameter that is commensurate with the first diameter D1 of the apertures 374a, 384a. As the attachment of the rivets 420 to the track member 358, the splicing plate 50, and the first plate 44a is identical to the attachment of the rivets 420 to the track member 358, the splicing plate 50, and the second plate 44b, the discussion relating to the attachment of the rivets 420 will be focused on only the attachment of the track member 358, the splicing plate 50, and the first plate 44a, with the understanding that the same would be done for the attachment of the track member 358, the splicing member 50, and the second plate 44b.

To assemble the rivets 420 with the track member 358, the splicing plate 50 and the first plate 44a, at each aperture 374a, the shank 424 of a rivet 420 is passed through the splicing plate 50, through the plate 44a, and through the first and second diameters D1, D2 of the aperture 374a of the first end portion 362 of the track member 358. A bloom 426 is formed by conventional means at the end of the rivet 420 opposite the head 422. The bloom 426 has a diameter that is smaller than the second diameter D2 of the aperture 374*a* but that is larger than the first diameter D1 of the aperture 374*a*. Thus, the rivet bloom 426 lays along the shoulder 376 of the first end portion 362 of the track member 358 within the second diameter D2 of the aperture 374*a*, and rivet 420 attaches the track member 358, the plate 44*a* and the splicing plate 50 together.

Similarly, to assemble the rivets 420 with the track member 358, the splicing plate 50 and the first plate 44*a*, at each aperture 374*b*, the shank 424 of a rivet 220 is passed through the splicing plate 50, through the plate 44*a*, and through the aperture 374*b* of the first end portion 362 of the track member 358. A bloom 426 is formed by conventional means at the end of the rivet 420 opposite the head 422. The bloom 426 has a diameter that is smaller than the third diameter D3 of the aperture 374*b*. Thus, unlike the bloom 426 within the aperture 374*a*, the bloom 426 within the aperture 374*b* lays along the inner skin 54*a* of the plate 44*a* and within the third diameter D3 of the aperture 374*b*, and attaches the plate 44*a* and the splicing plate 50 together. The rivets 420 within the apertures 374*b* do not attach the track member 358 to the plate 44*a* and to the splicing plate 50.

The rivets 420 within the apertures 374*b* do not attach the track member 358 to the plate 44*a* and to the splicing plate 50 in order to prevent the total disassembly of the side wall 24 should the track member 358 become damaged. If the track member 358 becomes damaged, it can be easily removed by removing only the rivets 420 attaching the track member 358, the plate 44*a* and the splicing plate 50 together. When these rivets 420 are removed, the rivets 420 that attach the plate 44*a* to the splicing plate 50, and which are within the apertures 374*b* of the track member 358, will hold the side wall 24 in place until a new track member 358 is attached into place. This is because the track member 358 is not a structural post as the plates 44*a*, 44*b* provide the structural strength. A benefit of this construction is that because the plates 44*a*, 44*b* reinforce the track member 358, the track member 358 does not spread even if it is hit with a forklift.

As the blooms 426 are either positioned within the second diameter D2 of the apertures 374*a* or within the third diameter D3 of the apertures 374*b*, the blooms 426 are protected as they are recessed within the apertures 374*a*, 374*b*, such that they will not be sheared off, by, for example, a forklift.

The anchoring system 348 thus has a generally low profile within the interior of the trailer 20 which will help prevent the damage of the track member 358 by forklifts or other means and will allow for more cargo to be stored within the body 22 of the trailer 20.

The track members 358 support a plurality of elongated beams 428. An example of a beam 428 of this type is manufactured and sold by Ancra International LLC. Each beam 428 has opposite ends 430, 432 at which the beam 428 has both sliding means (not shown), for sliding within the slot 401 of the track member 358, and locking means (not shown), for locking the sliding means of the beam 428 into a desired position within the slot 401. The sliding means is preferably a T-shaped protrusion extending from the ends 430, 432 of the beam 428 that are formed to slide within the slot 401. The locking means is preferably a device that can easily lock or unlock into the slot 401 within the arc-shaped recesses 403, 405 of the third and fifth portions 395, 399.

In operation, the sliding means at one end 430 of the beam 428 is generally inserted into the slot 401 at a top 434 of one of the track members 358 along one of the side walls 24. The sliding means at the opposite end 432 of the beam 428 is then inserted into the slot 401 at the top 434 of another one of the track members 358 along the opposite side wall 24. The beam 428 telescopes to allow for insertion and connection of beam 428 to the track members 358 and movement of the beam 428 relative to side wall 24.

The ends 430, 432 of the beam 428 are then lowered to a desired position and locked into place by the locking means. One end can be lowered and then the other end can be lowered, with the telescoping capability of the beam 428 allowing for this movement. When a number of beams 428 are positioned into place along the side walls 24, the beams 428 are capable of supporting cargo 436 or a removable deck 438. Should the cargo 436 within the trailer body 22 not need to be supported by the beams 428, the beams 428 can be slid within the slot 401 toward the roof 30 of the trailer body 22 and locked into position by the locking means at the top 434 of the track member 358.

Figure 12:
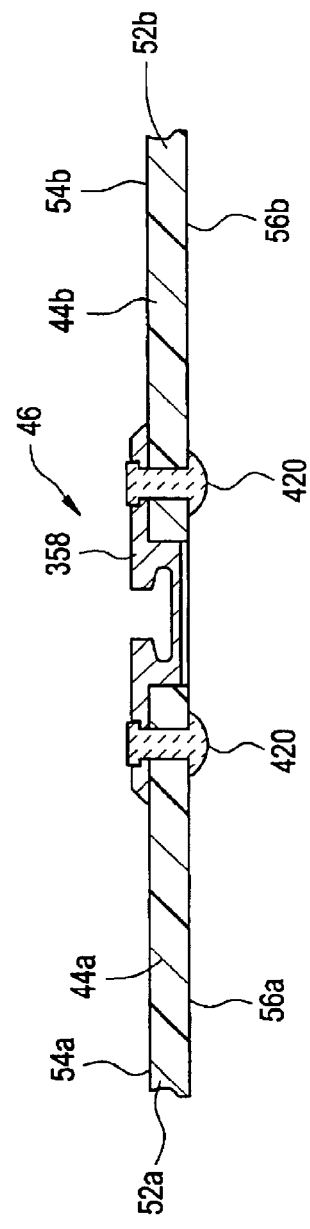
FIG. 12 is a cross-sectional view of the joint including the track member shown in FIG. 10.
Figure 8:
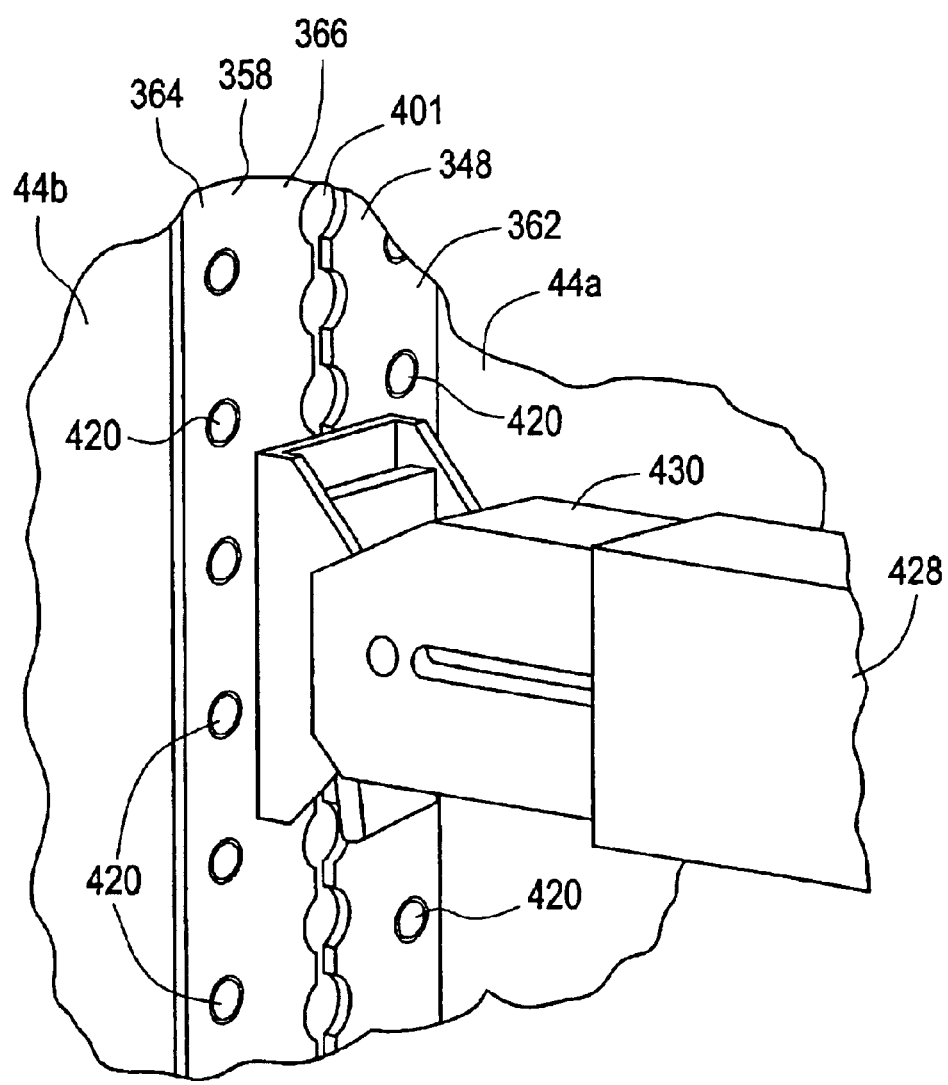
FIG. 8 is a partial perspective view of the joint which includes an anchoring system which incorporates the features of a second embodiment of the invention.

It should be noted that the splicing plate 50 could be removed from the joints 46 by providing one or both of the outer skins 56*a*, 56*b* with a length that is substantially longer than the lengths of the respective inner skins 54*a*, 54*b*. For example, as shown in FIG. 12, the outer skins 56*a* of the first plates 44*a* would extend behind the track members 158, 358 and lie against the outer skins 56*b* of the second plates 44*b*. The outer skins 56*a* could lie against outer skins 56*b* on the insides thereof or on the outsides thereof. The rivets 220, 420 would then attach the plates 44*a*, 44*b* and the track members 158, 358 in the same manner as described hereinabove with regard to the splicing plates 50 are utilized. The extension of the outer skins 56*a* eliminates the need for the separate splicing plates 50 as used in the first and second embodiments. The outer skins 56*a* are very thin, however, and, as such, do not provide as much reinforcement as the splicing plates 50 provide. The extension of the outer skins 56*a* seal the junction between the plates 44*a*, 44*b* on the exterior of the trailer 20 so as to seal the interior from moisture.

In addition, while the present invention has been described with respect to trailers, it is to be understood that it could be used on other types of vehicles, such as trucks.

While preferred embodiments of the present invention are shown and described, it is envisioned that those skilled in the art may devise various modifications of the present invention without departing from the spirit and scope of the appended claims.

The invention claimed is:

1. A joint between side plates adapted for use in a side wall of a vehicle body, comprising:

a first plate having a first end and a second end, said first plate being comprised of an inner skin, an outer skin and a core member between said inner skin and said outer skin of said first plate;

a second plate having a first end and a second end, said second plate being comprised of an inner skin, an outer skin and a core member between said inner skin and said outer skin of said second plate;

a track member having a first end portion, a second end portion and a middle portion, said middle portion being positioned between at least a portion of said first plate and at least a portion of said second plate such that said middle portion abuts against at least a portion of said second end of said first plate and at least a portion of said first end of said second plate, said first end portion of said track member being attached to said inner skin of said first plate, said second end portion of said track member being attached to said inner skin of said second plate, said middle portion having a top, a bottom, and at least one elongated slot extending substantially from said top to said bottom thereof for accepting at least one associated member; and means for attaching said outer skins of said first and second plates together.

2. A joint between side plates adapted for use in a side wall of a vehicle body, comprising:

a first plate having a first end and a second end, said first plate being comprised of an inner skin, an outer skin and a core member between said inner skin and said outer skin of said first plate;

a second plate having a first end and a second end, said second plate being comprised of an inner skin, an outer skin and a core member between said inner skin and said outer skin of said second plate;

a track member having a first end portion, a second end portion and a middle portion, said middle portion being positioned between at least a portion of said first plate and at least a portion of said second plate such that said middle portion abuts against at least a portion of said second end of said first plate and at least a portion of said first end of said second plate, said first end portion of said track member being attached to said inner skin of said first plate, said second end portion of said track member being attached to said inner skin of said second plate, said middle portion having a top, a bottom, and at least one elongated slot extending substantially from said top to said bottom thereof for accepting at least one associated member, each said end portion of said track member has a plurality of apertures provided therethrough and wherein at least one of said plurality of apertures has a first diameter and a second diameter, said second diameter being larger than said first diameter, and wherein at least another one of said plurality of apertures has a third diameter; and means for attaching said outer skins of said first and second plates together.

3. A joint as defined in claim 2, further including first rivets which are provided through said attaching means, said plates, and said at least one of said plurality of apertures having said first and second diameters, each said first rivet having a first rivet bloom, said first rivet blooms having a diameter that is larger than said first diameter and smaller than said second diameter such that each said first rivet bloom lays against said track member, said first rivets attaching said attaching means, said plates and said track member together.

4. A joint as defined in claim 3, wherein said first rivet bloom lays within said second diameter of said at least one of said plurality of apertures having said first and second diameters.

5. A joint as defined in claim 3, further including second rivets which are provided through said attaching means and said plates, each said second rivet having a second rivet bloom, said second rivet blooms having a diameter that is smaller than said at least another one of said plurality of apertures having said third diameter such that each said second rivet lays against one of said plates, said second rivets attaching said attaching means and said plates together.

6. A joint as defined in claim 5, wherein said first rivet bloom lays within said second diameter of said at least one of said plurality of apertures having said first and second diameters, and wherein said second rivet bloom lays within said at least another one of said plurality of apertures having said third diameter.

7. A joint as defined in claim 2, further including rivets which are provided through said attaching means and said plates, each said rivet having a rivet bloom, said rivet blooms having a diameter that is smaller than said at least another one of said plurality of apertures having said third diameter such that each said rivet lays against one of said plates, said rivets attaching said attaching means and said plates together.

8. A joint as defined in claim 7, wherein said rivet bloom lays within said at least another one of said plurality of apertures having said third diameter.

9. A joint as defined in claim 1, wherein said track member is formed of rolled steel.

10. A joint as defined in claim 1, wherein said track member is formed of aluminum.

11. A joint as defined in claim 1, wherein said middle portion has a thickness that is thinner than a thickness of said end portions.

12. A joint as defined in claim 11, wherein said thickness of said middle portion is 0.09375 inches and said thickness of said end portions is 0.142 inches.

13. A joint as defined in claim 1, wherein said attaching means is a splicing member.

14. A joint between side plates adapted for use in a side wall of a vehicle body, the vehicle body having an upper end and a lower end to define a height of the vehicle body, the vehicle body having an interior, said joint comprising:

a pair of plates, each said plate being comprised of an inner skin, an outer skin and a core member between said inner skin and said outer skin;

means for anchoring at least one associated member, said anchoring means having a portion thereof positioned between said plates, said anchoring means abutting against, and being attached to, said inner skins of said plates, said anchoring means having a top, a bottom, and at least one elongated slot configured to substantially continuously extend from said top to said bottom thereof along a substantial portion of the height of the vehicle body; and means for attaching said outer skins of said plates together.

15. A joint as defined in claim 14, wherein said anchoring means comprises a track member having opposite end portions and a middle portion therebetween, said middle portion being positioned between said plates such that said middle portion abuts against said plates, one of said end portions abutting against and being attached to one of said plates, the other of said end portions abutting against and being attached to said other of said plates, said middle portion having said at least one elongated slot therein for accepting said at least one associated member.

16. A vehicle body comprising:

an upper end;

lower end;

side walls, each said side wall comprised of at least two adjacent plates which form a plate pair, each said plate having a first end and a second end, each said plate being comprised of an inner skin, an outer skin, and a core member between said inner skin and said outer skin;

a track member provided between each said plate pair, each said track member having a first end portion, a second end portion and a middle portion, said middle portion being positioned between at least a portion of one of said adjacent plates and at least a portion of the other of said adjacent plates such that said middle portion abuts against at least a portion of said second end of said one of said adjacent plates and at least a portion of said first end of said other of said adjacent plates, said first end portion being attached to said inner skin of said one of said adjacent plates, said second end portion being attached to said inner skin of said other of said adjacent plates, said middle portion having a top, a bottom, and at least one elongated slot extending substantially from said top to said bottom thereof;

at least one associated member capable of being inserted into said at least one elongated slot; and means for attaching said outer skins of each said plate pair together.

17. A vehicle body as defined in claim 16, wherein said at least one associated member is an elongated beam.

18. A vehicle body as defined in claim 16, wherein said at least one associated member has opposite ends with each opposite end of said at least one associated member having means for sliding within said at least one elongated slot and means for locking said at least one associated member in a desired position within said at least one elongated slot.

19. A vehicle body comprising:

a top;

a floor;

side walls, each said side wall comprised of at least two adjacent plates which form a plate pair, each said plate having a first end and a second end, each said plate being comprised of an inner skin, an outer skin, and a core member between said inner skin and said outer skin;

a track member provided between each said plate pair, each said track member having a first end portion, a second end portion and a middle portion, said middle portion being positioned between at least a portion of one of said adjacent plates and at least a portion of the other of said adjacent plates such that said middle portion abuts against at least a portion of said second end of said one of said adjacent plates and at least a portion of said first end of said other of said adjacent plates, said first end portion being attached to said inner skin of said one of said adjacent plates, said second end portion being attached to said inner skin of said other of said adjacent plates, said middle portion having a top, a bottom, and at least one elongated slot extending substantially from said top to said bottom thereof, each said end portion of each said track member has a plurality of apertures provided therethrough, at least one of said plurality of apertures has a first diameter and a second diameter, said second diameter being larger than said first diameter, and wherein at least another one of said plurality of apertures has a third diameter;

at least one associated member capable of being inserted into said at least one elongated slot; and means for attaching said outer skins of each said plate pair together.

20. A vehicle body as defined in claim 19, further including first rivets provided through each said attaching means, each said plate pair, and said at least one of said plurality of apertures having said first and second diameters, each said first rivet having a first rivet bloom, each said first rivet bloom having a diameter that is larger than said first diameter and smaller than said second diameter such that each said first rivet bloom lays against each said track member, said first rivet attaching each said attaching means, each said plate pair and each said track member together.

21. A vehicle body as defined in claim 20, wherein said first rivet bloom lays within said second diameter of said at least one of said plurality of apertures having said first and second diameters.

22. A vehicle body as defined in claim 20, further including second rivets provided through each said attaching means and each said plate pair, each said second rivet having a second rivet bloom, each said second rivet bloom having a diameter that is smaller than said at least another one of said plurality of apertures having said third diameter such that each said second rivet lays against one of said adjacent plates, each said second rivet attaching each said attaching means and each said plate pair together.

23. A vehicle body as defined in claim 22, wherein said first rivet bloom lays within said second diameter of said at least one of said plurality of apertures having said first and second diameters, and wherein said second rivet bloom lays within said at least another one of said plurality of apertures having said third diameter.

24. A vehicle body as defined in claim 19, further including rivets provided through each said attaching means and each said plate pair, each said rivet having a rivet bloom, each said rivet bloom having a diameter that is smaller than said at least another one of said plurality of apertures having said third diameter such that each said rivet lays against one of said adjacent plates, each said rivet attaches each said attaching means and each said plate pair together.

25. A vehicle body as defined in claim 24, wherein said rivet bloom lays within said at least another one of said plurality of apertures having said third diameter.

26. A vehicle body as defined in claim 16, wherein each said track member is formed of rolled steel.

27. A vehicle body as defined in claim 16, wherein each said track member is formed of aluminum.

28. A vehicle body as defined in claim 16, wherein each said track member extends proximate to, but is spaced from, said upper end of said vehicle body.

29. A vehicle body as defined in claim 16, further comprising a scuff plate attached to each of said side walls proximate to said lower end, each said track member extends proximate to a top of said scuff plates.

30. A vehicle body as defined in claim 16, wherein said middle portion has a thickness that is thinner than a thickness of said end portions.

31. A vehicle body as defined in claim 30, wherein said thickness of said middle portion is 0.09375 inches and said thickness of said end portions is 0.142 inches.

32. A vehicle body as defined in claim 16, wherein each said attaching means is a splicing member.

33. A vehicle body comprising:

an upper end;

lower end;

a height which is defined by said upper end and said lower end of the vehicle body;

side walls, each said side wall comprised of at least two adjacent plates which form a plate pair, each said plate having a first end and a second end, each said plate being comprised of an inner skin, an outer skin, and a core member between said inner skin and said outer skin;

an interior;

an associated member capable of extending between said side walls;

means for anchoring said at least one associated member, said anchoring means being provided between each said plate pair and being attached to said inner skins of said adjacent plates, said anchoring means having a top, a bottom, and at least one elongated slot configured to substantially continuously extend from said top to said bottom thereof along a substantial portion of said height of the vehicle body; and means for attaching said outer skins of said adjacent plates together.

34. A vehicle body as defined in claim 33, wherein each said anchoring means comprises a track member having opposite end portions and a middle portion therebetween, said middle portion being positioned between each said plate pair such that said middle portion abuts against said adjacent plates, one of said end portions abutting against and being attached to one of said adjacent plates, said other of said end portions abutting against and being attached to said other of said adjacent plates, said middle portion having said at least one elongated slot therein for accepting said at least one associated member.

35. A vehicle body as defined in claim 34, wherein said at least one elongated slot is configured to permit said at least one associated member to travel substantially continuously between said top of said anchoring means and said bottom of said anchoring means.

36. A vehicle body as defined in claim 33, wherein said at least one elongated slot is configured to be open to, and accessible from, said interior of the vehicle body.

37. A joint as defined in claim 1, wherein the vehicle body has an upper end and a lower end to define a height of the vehicle body, and an interior, said at least one elongated slot configured to substantially continuously extend along a substantial portion of the height of the vehicle body.

38. A joint as defined in claim 37, wherein said at least one elongated slot is configured to be open to, and accessible from, the interior of the vehicle body.

39. A joint as defined in claim 1, wherein said at least one elongated slot is configured to permit said at least one associated member to travel substantially continuously between said top of said middle portion of said track member and said bottom of said middle portion of said track member.

40. A joint as defined in claim 14, wherein said at least one elongated slot is configured to be open to, and accessible from, the interior of the vehicle body.

41. A joint as defined in claim 15, wherein said at least one elongated slot is configured to permit said at least one associated member to travel substantially continuously between said top of said anchoring means and said bottom of said anchoring means.

42. A vehicle body as defined in claim 16, wherein a height of the vehicle body is defined between said upper and lower ends of the vehicle body, and wherein the vehicle body has an interior, said at least one elongated slot configured to substantially continuously extend along a substantial portion of said height of the vehicle body.

43. A vehicle body as defined in claim 42, wherein said at least one elongated slot is configured to be open to, and accessible from, said interior of the vehicle body.

44. A vehicle body as defined in claim 16, wherein said at least one elongated slot is configured to permit said at least one associated member to travel substantially continuously between said top of said middle portion of said track member and said bottom of said middle portion of said track member.

* * * * *